US008749378B2

(12) United States Patent
Srinivasan et al.

(10) Patent No.: US 8,749,378 B2
(45) Date of Patent: Jun. 10, 2014

(54) SYSTEM AND METHOD FOR SEARCHING PHYSICAL OBJECTS

(75) Inventors: Vikram Srinivasan, Singapore (SG); Mehul Motani, Singapore (SG); Kok Klong Yap, Singapore (SG)

(73) Assignee: National University of Singapore, Singapore (SG)

( * ) Notice: Subject to any disclaimer, the term of this patent is extended or adjusted under 35 U.S.C. 154(b) by 1252 days.

(21) Appl. No.: 11/887,958

(22) PCT Filed: Apr. 7, 2006

(86) PCT No.: PCT/SG2006/000091
§ 371 (c)(1),
(2), (4) Date: Dec. 18, 2008

(87) PCT Pub. No.: WO2006/107282
PCT Pub. Date: Oct. 12, 2006

(65) Prior Publication Data
US 2009/0128302 A1 May 21, 2009

Related U.S. Application Data

(60) Provisional application No. 60/668,968, filed on Apr. 7, 2005.

(51) Int. Cl.
*G08B 1/08* (2006.01)
(52) U.S. Cl.
USPC ............. 340/539.32; 340/10.1; 340/505; 340/539.1
(58) Field of Classification Search
USPC .............. 340/539.32, 10.1, 505, 539.1
See application file for complete search history.

(56) References Cited

U.S. PATENT DOCUMENTS

| 5,051,741 | A | | 9/1991 | Wesby | |
|---|---|---|---|---|---|
| 5,742,237 | A | * | 4/1998 | Bledsoe | ............ 340/8.1 |
| 6,354,493 | B1 | * | 3/2002 | Mon | ............ 235/380 |

(Continued)

FOREIGN PATENT DOCUMENTS

| GB | 2 298 098 A | 8/1996 |
|---|---|---|
| JP | 2001-116583 A | 4/2001 |

(Continued)

OTHER PUBLICATIONS

International Preliminary Report on Patentability and Written Opinion of the International Searching Authority.

(Continued)

*Primary Examiner* — George Bugg
*Assistant Examiner* — Naomi Small
(74) *Attorney, Agent, or Firm* — Schwabe, Williamson & Wyatt, P.C.

(57) ABSTRACT

A system and method for searching physical objects is described and claimed. The system may include one or more tags, each tag being disposed on one associated object; one or more substations, each substation arranged for communication with tags located within a range around each substation; and one or more base stations, each base station arranged for communication with substations located within a range around each base station. An interrogation engine may reside in each base station for interrogating, in response to a search query, the substations within the range around each base station, to determine whether a search object of the search query is within the range around the respective substations.

22 Claims, 14 Drawing Sheets

(56) References Cited

U.S. PATENT DOCUMENTS

| | | |
|---|---|---|
| 6,512,478 B1 | 1/2003 | Chien |
| 6,657,549 B1 * | 12/2003 | Avery ............................. 340/8.1 |
| 7,323,989 B2 * | 1/2008 | Allen .......................... 340/572.1 |
| 7,556,194 B2 * | 7/2009 | Rogoyski ...................... 235/385 |
| 7,671,718 B2 * | 3/2010 | Turner et al. ................. 340/5.61 |
| 2002/0087436 A1 | 7/2002 | Guthrie et al. |
| 2002/0122003 A1 | 9/2002 | Patwari et al. |
| 2002/0134836 A1 * | 9/2002 | Cash et al. .................... 235/385 |
| 2004/0070499 A1 * | 4/2004 | Sawinski ................... 340/568.1 |
| 2006/0145854 A1 * | 7/2006 | Garber et al. ............. 340/572.1 |

FOREIGN PATENT DOCUMENTS

| | | |
|---|---|---|
| JP | 2004-102370 A | 4/2004 |
| WO | 0106401 A1 | 1/2001 |
| WO | WO 01/11386 A1 | 2/2001 |

OTHER PUBLICATIONS

International Search Report for PCT/SG2006/000091, mailed on Jun. 19, 2006.
Office Action for Chinese Application No. 200680020386.6, issued on Aug. 11, 2010.
Office Action for Chinese Application No. 200680020386.6, issued on Apr. 12, 2011.
Extended Search Report for EP Application No. 06 733 534.9, issued on Apr. 14, 2011.
Office Action for EP Application No. 06733534.9, issued on Jul. 26, 2012.

\* cited by examiner

MAX: Finding A Place

Settings Location Choices

| Book, Harry Potter,Rowling, Secrets | Search |

Searched *Home, Jane's* for *Book, Harry Potter,Rowling, Secrets*

Book: Joanne Kathleen Rowling, Harry Potter and the Chamber of Secrets
located at peter's bedroom -> bed -> shelf

Book: J.K. Rowling, Harry Potter and the Half-Blood Prince
located at peter's bedroom -> wooden bookshelf -> 2nd shelf

Book: JK Rowling, Harry Potter and the Philosopher's Stone
located at peter's bedroom -> wooden bookshelf -> 2nd shelf

Video: Harry Potter and the Philosopher's Stone, Warner Bros
located at hall -> tv shelf -> cd rack

Book: JK Rowling, Harry Potter and the Philosopher's Stone
located at jane's bedroom -> study table

Figure 2

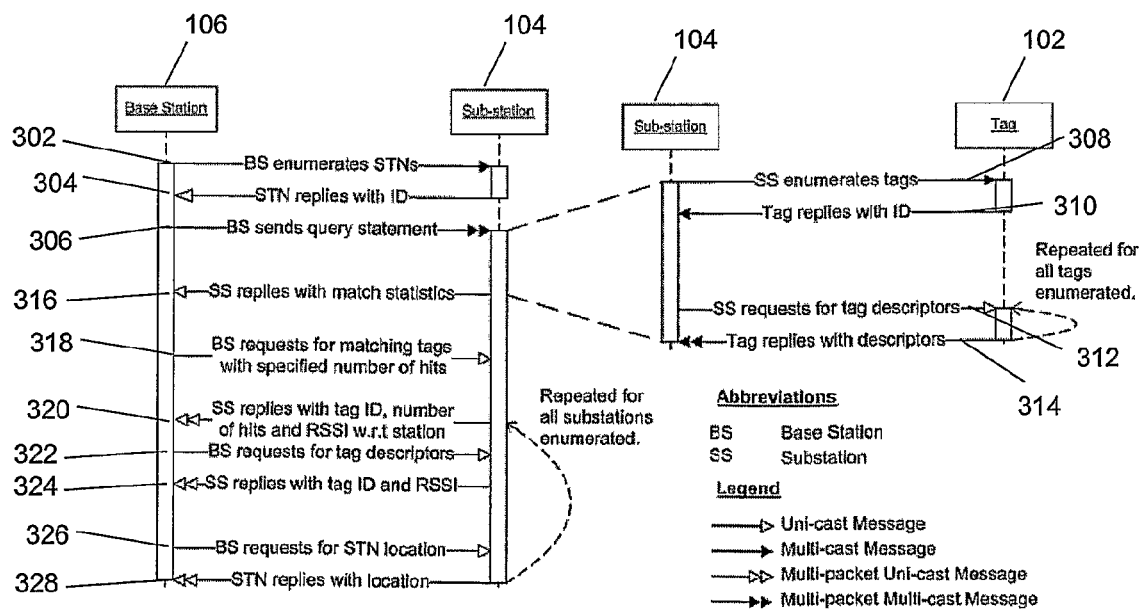

Figure 3

Table I  Hardware Device Parameters

| Description | Symbol | Value |
|---|---|---|
| General Values | | |
| Length of Match Value | $L_M$ | 1 byte |
| Length of RSSI Values | $L_R$ | 1 byte |
| Length of Query | $L_Q$ | 4 words |
| Maximum Length of Descriptor | $L_D$ | 8 words |
| Length of Each Word | $L_W$ | 16 bytes[a] |
| Base-station to Sub-stations Communication (MICA2DOT Mote)[b] | | |
| Power Required to Transmit | $P_S^T$ | 8.7 mW[c] |
| Data Rate | $R_S$ | 38.4 kbps |
| Substations (MICA2 Mote)[d] | | |
| Processing Speed | $S_S$ | 4 MHz |
| Power Required | $P_S^A$ | 46.5 mW |
| Substation-Tags Communication (SkyeRead M1-Mini[e]) | | |
| Power Required[f] | $P_T$ | 82.5 mW |
| Data Rate[g] | $R_T$ | 26 kbps |
| Tags (RFID)[h] | | |
| Processing Speed[i] | $S_T$ | 20 kHz |

[a] The average length of an English word, considering all words, is between 4 and 5. However, the average length of word in use may not be so. Thus, a convenient value is chosen for analysis before an more accurate value can be determined from further research.

[b] Information can be found in [4] and [5].

[c] This represents the additional power required for the sub-station to transmit. The power required to keep it awake is also required.

[d] Information are extracted from [4].

[e] The reader has a read range of 7 to 15 cm depending on the antenna used. The values are available in [6]. The SkyeRead M1-Mini is assumed to be switched off when not in use, thus drawing 60 μA.

[f] Power is provided by RFID reader.

[g] Data rate is based on ISO15693.

[h] Processing power would be the same as the communication power requirement at 82.5 mW, since the tags are passive.

[i] The processing of the RFID tag are accomplished by hardware implementations and thus support true parallel processing. However, the speed is highly restricted by the power available. Thus, a equivalent speed of 18.7 kHz is estimated from the required processing for comparing an unique identifier, as specified in ISO15693. Therefore, the convenient value of 20 kHz is used.

Figure 6a

Table II  Simulation Parameters

| Description | Symbol | Value |
|---|---|---|
| Number of Substations | | |
| Exact Number of Substations[a] | $N_S$ | 50 |
| Number of Tags | | |
| Sum of Tags under each Substation[b] | $\sum_i N_T^i$ | 2250 |
| Maximum Number of Tags under a Substation | $\max_i N_T^i$ | 45 |
| Number of Selected Tags | | |
| Total Number of Selected Tags[c] | $N_{T(S)} = \sum_i N_{T(S)}^i$ | 40 |
| Maximum Number of Selected Tags under a Substation[d] | $\max_i N_{T(S)}^i$ | 10 |
| Scaling Factor for Different Decision[e] | | |
| Decision by Substations | | 1.5 |
| Decision by Base-Station, where a threshold match count is used for querying the descriptors. | | 1.3 |
| Decision by Base-Station based on approximated statistics, where specific identities are used for querying the descriptors. | | 1.15 |
| Decision by Base-Station based on accurate statistics and specific identities are used for querying the descriptors. | | 1 |

[a] We consider a 5 m by 5 m room densely deployed with sub-stations. Thus, the total number of furniture and immobile objects is estimated to be around 50.

[b] An average of 30 tags is expected for each sub-station, giving a total of 1500 tags in reality. However, due to overlapping coverage of the sub-stations, the number is multiplied by 1.5. This degree of overlap is low, since we are considering Skye's RFID reader with a maximum range of 15 cm.

[c] We assume that a user would require a total of 40 results only. It is based on the intuition that searches are seldom useful beyond a small portion of the returned results.

[d] We assume an asymmetric distribution of desired objects in the room. This is assumed because it is common to cluster similar objects together.

[e] We note that the values of $\sum_i N_{T(S)}^i$ and $\max_i N_{T(S)}^i$ would be different for different types of decision made. For example in Figure , the tag $d$ will be returned twice by sub-stations 1 and 2 if a local decision is made. This is because this overlap information is not available to all the sub-stations. Thus, we scale these values for different decisions made.

Figure 6b

Table III   Energy-Latency Values of Optimal Protocols

| Scenarios[a] | | | Energy /J | Latency /s[b] | |
|---|---|---|---|---|---|
| 1 | Centralized | Dumb Tags | Heuristic | 12.346 | 4.672 |
| 2 | Centralized | Smart Tags | Heuristic | 0.663 | 3.355 |
| 3 | Distributed | Dumb Tags | Heuristic | 12.344 | 4.641 | — 702
| 4 | Distributed | Smart Tags | Heuristic | 0.637 | 3.323 |
| 5 | Centralized | Dumb Tags | Maximally relevant | 12.511 | 7.762 |
| 6 | Centralized | Smart Tags | Maximally relevant | 0.767 | 6.378 |
| *High Overlap System* | | | | | |
| 7 | Centralized | Dumb Tags | Heuristic | 41.097 | 15.162 |
| 8 | Centralized | Smart Tags | Heuristic | 1.519 | 7.420 |
| 9 | Distributed | Dumb Tags | Heuristic | 40.810 | 12.674 | — 704
| 10 | Distributed | Smart Tags | Heuristic | 0.860 | 3.764 |
| *Low Number of Tags* | | | | | |
| 11 | Centralized | Dumb Tags | Heuristic | 3.678 | 3.413 |
| 12 | Centralized | Smart Tags | Heuristic | 0.538 | 3.369 |
| 13 | Distributed | Dumb Tags | Heuristic | 3.672 | 3.283 | — 706
| 14 | Distributed | Smart Tags | Heuristic | 0.538 | 3.283 |
| *High Number of Tags* | | | | | |
| 15 | Centralized | Dumb Tags | Heuristic | 17.782 | 5.729 |
| 16 | Centralized | Smart Tags | Heuristic | 0.757 | 3.658 | — 708
| 17 | Distributed | Dumb Tags | Heuristic | 17.768 | 5.653 |
| 18 | Distributed | Smart Tags | Heuristic | 0.676 | 3.437 |

[a] Smart refers to the capability of the tags.
[b] If the optimal energy protocol is not equal to the optimal latency protocol, the energy of the optimal energy protocol and the latency of the optimal latency protocols are given.

Figure 7

SYSTEM AND METHOD FOR SEARCHING PHYSICAL OBJECTS

CROSS-REFERENCE TO RELATED APPLICATIONS

The present application is a U.S. national stage application under 35 U.S.C. §371 of PCT Application No. PCT/SG2006/000091, filed Apr. 7, 2006, which in turn claims priority to U.S. Provisional Patent Application No. 60/668,968, filed Apr. 7, 2005, which are hereby incorporated by reference in their entireties for all purposes except for those sections, if any, that are inconsistent with this specification.

FIELD OF INVENTION

The present invention relates to a system and method for searching physical objects.

BACKGROUND

With the advancement in information and communication technology, search engines have become so efficient at generating information to a search query that it is not necessary to download and save data locally anymore. Thus, it is now an effortless task to look up information on the internet.

Further, less time and effort in planning and organization is required without compromising on efficiency. For example, Google's Gmail allows emails to be labelled and searched efficiently. People can now do away with organizing and filing their emails.

However, searching for physical objects remains a tedious and difficult task. A lot of time and effort may be spent in looking for a particular object or in organizing the physical objects for easy retrieval in the future.

Therefore, a need exists to provide a system and method for searching physical objects to address the above-mentioned problem.

SUMMARY

In accordance with a first aspect of the present invention, there is provided a system for searching physical objects, the system comprising: one or more tags, each tag being disposed on one associated object; one or more substations, each substation arranged for communication with tags located within a range around each substation; one or more base stations, each base station arranged for communication with substations located within a range around each base station; an interrogation engine residing in each base station for interrogating, in response to a search query, the substations within the range around each base station, to determine whether a search object of the search query is within the range around the respective substations.

The system may further comprise one or more query terminals for inputting the search query and for displaying search results.

Each substation may provide a list of the tag descriptions of tags within the range around said each substation to the interrogation engine together with a value indicative of signal strengths from the respective tags.

The interrogation engine, if one tag is within the range around two or more substations, may assign said one tag to the substation for which a higher value indicative of signal strength is received.

The tag descriptions may comprise descriptions of the respective physical objects the tags are disposed on.

Each base station may be arranged for labelling a space corresponding to the range of said each base station as public or private, and the interrogation engine may process the search queries in a manner dependent on whether the space is public or private associated with a user.

Each tag may be arranged for labelling the associated object as public or private, and the interrogation engine may process the search queries in a manner dependent on whether the object is public or private associated with a user.

The interrogation engine may instruct display of search results in a binary form if the search object is public and is located in a private space.

The interrogation engine may instruct display of search results in a binary form if the search object is private associated with one user and the search object is located in a private space associated with another user.

The interrogation engine may be implemented centralised in the base-station, or the interrogation engine may be implemented in a distributed manner on the base-station and one or more of the substations or tags.

An interrogation engine protocol may be optimised for energy, latency, or both.

In accordance with a second aspect of the present invention, there is provided a method for searching physical objects, the method comprising: disposing one or more tags, each tag being disposed on one associated object; arranging one or more substations for communication with tags located within a range around each substation; arranging one or more base stations for communication with substations located within a range, around each base station; utilising an interrogation engine residing in each base station for interrogating, in response to a search query, the substations within the range around each base station, to determine whether a search object of the search query is within the range around the respective substations.

The method may further comprise utilising one or more query terminals for inputting the search query and for displaying search results.

The method may further comprise utilising each substation for providing a list of the tag descriptions of tags within the range around said each substation to the interrogation engine together with a value indicative of signal strengths from the respective tags.

The method may further comprise utilising the interrogation engine, if one tag is within the range around two or more substations, for assigning said one tag to the substation for which a higher value indicative of signal strength is received.

The tag descriptions may comprise descriptions of the respective physical objects the tags are disposed on.

The method may further comprise arranging each base station for labelling a space corresponding to the range of said each base station as public or private, and utilising the interrogation engine for processing the search queries in a manner dependent on whether the space is public or private associated with a user.

The method may further comprise arranging each tag for labelling the associated object as public or private, and utilising the interrogation engine for processing the search queries in a manner dependent on whether the object is public or private associated with a user.

The method may further comprise utilising the interrogation engine for instructing display of search results in a binary form if the search object is public and is located in a private space.

The method may further comprise utilising the interrogation engine for instructing display of search results in a binary form if the search object is private associated with one user and the search object is located in a private space associated with another user.

The method may further comprise implementing the interrogation engine centralised in the base-station, or implementing the interrogation engine in a distributed manner on the base-station and one or more of the substations or tags.

The method may further comprise optimising an interrogation engine protocol for energy, latency, or both.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 2 shows a sample display of search results of the system.

FIG. 3 shows an overview of a protocol used with a prototype of the system.

FIG. 6a shows Table I which shows hardware device parameters of the system.

FIG. 6b shows Table II which shows simulation parameters of the system.

FIG. 7 shows Table III which shows energy-latency values of protocols.

DETAILED DESCRIPTION

Unless specifically stated otherwise, and as apparent from the following, it will be appreciated that throughout the present specification, discussions utilizing terms such as "sending", "calculating", "determining", "broadcasting", "generating", "retrieving", "outputting", or the like, refer to the action and processes of a computer system, or similar electronic device, that manipulates and transforms data represented as physical quantities within the computer system into other data similarly represented as physical quantities within the computer system or other information storage, transmission or display devices.

Figure 1:
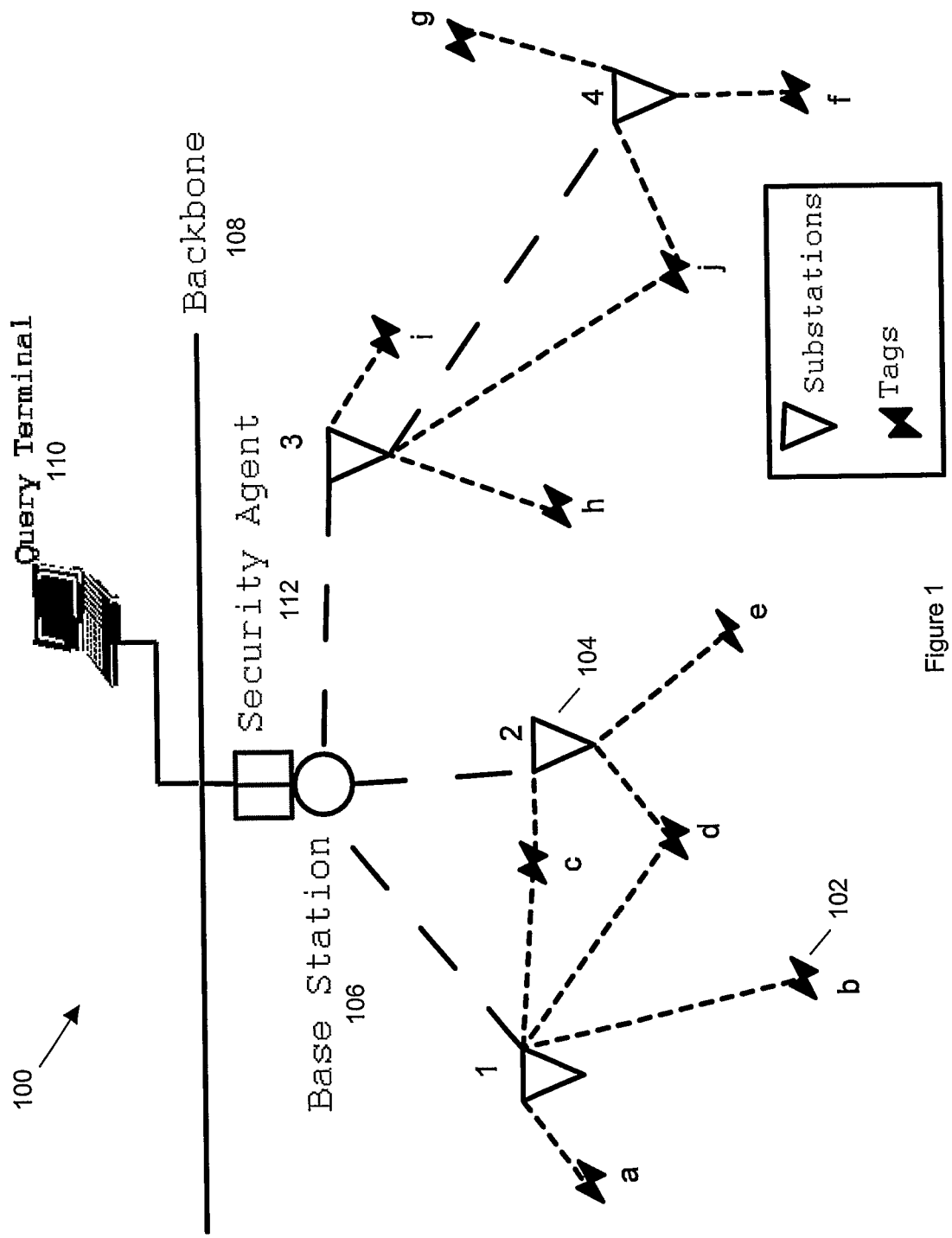
FIG. 1 shows a schematic diagram of an architecture of a system.

FIG. 1 shows a schematic diagram of an architecture of a system 100 for searching for physical objects. The system 100 comprises tags 102, substations 104 and base stations 106. The tags 102, substations 104 and base stations 106 are embedded at the time of manufacture of objects. Alternatively, the tags 102, substations 104 and base stations 106 can be placed on the objects by a user of the system 100. For example, by using printable antennas, it will be simple to write descriptors (e.g. book with author and title) of the objects into the tags 102 and stick the tags 102 onto the objects.

The system 100 adopts a hierarchical architecture, where the objects in lower tiers are more mobile than the objects in higher tiers. The base stations 106 are at the highest level of the hierarchy in the system architecture. Each base station 106 represents a locality, such as a room, which is static and stores a descriptor of the locality (e.g. Jack's office). Depending on the size of the locality, there can be one or more base stations 106 per locality. In addition, the base stations 106 also act as a gateway between the backbone network 108 and the tags 102.

The base stations 106 can be custom built powerful Radio Frequency Identification (RFID) readers or devices which communicate with the substations 104. The base stations 106 have memory and processing capabilities. Since the base stations 106 are line powered, the processing and energy burden on the substations 104 and tags 102 can be significantly reduced.

The substations 104 are at the next level of the hierarchy and describe objects, e.g. furniture, which are largely static and change positions only occasionally. The substations 104 are interrogated by the respective base stations 106. Each substation 104 stores the descriptor (e.g. coffee table) of the object it is attached to. A plurality of substations 104 can form a multi-hop ad hoc network and relay information to and from the base station 106. The substations 104 used are more complex and possess simple memory and processing capabilities. This is to reduce the burden of computation at a centralized location. The substations 104 can be a hybrid smart dust device and RFID reader. An example of a device that can be used as a substation 104 is Skye-Tek which integrates a Berkeley Mote with a RFID reader.

The tag 102 is at the lowest level of the hierarchy. The tag 102 is attached to objects, e.g. books, which are easily movable. Each tag 102 stores a descriptor (e.g. Book Harry Potter) of the object it is attached to.

The tag 102 can be a RFID tag. RFIDs can be divided into two fundamental categories, load based or RF based. Load based tags work via inductive coupling between the RFID reader and the tag and as a consequence, the detection range is limited to 15 cm or less. Due to the limited range, the base stations 106 may not be able to hear responses from the tags 102 and the substations 104 will have to be responsible for relaying information from the tags 102 to the base stations 106. Thus, a large number of substations 104 are required for receiving transmissions from all the tags 102. On the other hand, the advantage of using the load based tag is that the accuracy will be higher since the range is limited and each tag will be in range of very few substations.

RFID tags can be further categorised into active or passive. Passive tags are very simple devices which can only store information and require no power from batteries. When a reader radiates them with energy, passive tags respond by transmitting the stored information. The advantage of using passive tags is they do not require power supply and can last for a long period of time. Another advantage of using standard passive RFID tags is that off-shelf devices can be used and can save costs due to economies of scale. However, using passive tags may not result in a scalable protocol because every tag will respond with its descriptors irrespective of what the query is.

On the other hand, active tags are battery powered and thus capable of more processing. However, there may be a trade-off between cost and performance benefit for using active tags.

Alternatively, customized passive tags, also known as smart tags, which include simple logic gates, summers and comparators can be used. Smart tags are able to compare the query with its descriptor and responding conditionally to the query. Such modifications are possible without adding external energy sources such as batteries. However, customization leads to a loss in economies of scale resulting in a trade-off between the performance and cost of the system.

An example of an application of the system 100 is described in the following. When a user wishes to find an object, he places a query on a query terminal 110, which is connected to the base station 106 via a network backbone 108. The query terminal 110 is used to query the physical objects in a physical environment by providing a human-machine interface of the system 100. The interface is platform independent, allowing devices such as desktop computers, personal digital assistants, and mobile phones to be used as query terminals 110.

The query is then sent to one or more base stations 106. Each base station 106 then broadcasts the query to the substations 104 and the tags 102 in the vicinity. The tags 102 with one or more matching query words stored in them respond to the base stations 106. The substations 104 listen to the tag responses and report the Receive Signal Strength Indication (RSSI) values from the tags 102 to the base stations 106.

Whenever a search for a physical object e.g. cellular phone is made, the physical object is localized with respect to objects in the higher levels of the hierarchy, e.g. coffee table. Therefore, the tags results are displayed in an order of decreasing match counts along with estimated relative location of the tags 102. The match count is determined by the number of descriptors on the tag 102 which match the query. The relative location is estimated by associating the tag 102 with the substation 104 which hears the tag 102 with the maximum RSSI value. FIG. 2 shows a sample display of search results.

Despite the time varying nature of the wireless channel, RSSI is used to estimate the approximate location of the object because channel fluctuations are assumed to be small in largely static environments. Secondly, a transmission range of about one meter may be used for the substation 104. The localization error is always bounded within a circle of radius equal to the transmission range. The effect of shadowing is reduced at small transmission ranges and thus, RSSI is sufficient to help the user locate the object quickly. Furthermore, when locating objects which are encased in metal e.g. a metal cabinet, the substations 104 can be designed such that the antenna is on the outside of the metal cabinet. This allows objects enclosed within metal cabinets to be located easily.

Referring back to FIG. 1, the system 100 also enables a variety of new applications which involve the sharing and trading of physical resources. For example, in a university campus, expensive and hard to find books can, be shared between professors and students. Used text books can be tagged as being for sale, without having to go through the effort of advertising them.

The system 100 also enables the user to restrict the searching of his physical possessions by the public. Consider a simple application of sharing books in a college campus, the system 100 allows, the user to designate a certain set of books as public and the rest of the books as private. Anyone is able to determine the existence of and location of the public books while only the user is able to locate the private books. Further, the user may not wish his personal space to be searchable by other people.

Thus, the critical elements of this application of the system 100 are security and privacy. The primary security and privacy risk that the system 100 faces is the fact that the system 100 uses wireless technology to communicate. Therefore, there is a need to provide for secure authentication and access to guard the privacy of both physical objects and physical spaces. Privacy of objects is provided by cryptographic techniques while privacy of space is provided by security agents 112.

As previously described, objects marked as private can only be searched for by its owner and objects marked as public are searchable by anyone. Each user is authenticated at the query terminal 110 and a pair of public and private cryptographic keys is retrieved for the user or will be created for new users.

Given the hardware constraints of the tags 102 and substations 104, it is not feasible for any complicated authentication to be performed by the tags 102 and substations 104. The tags 102 and substations 104 merely store information either in encrypted form or as clear text allowing them to be simple and cheap. Moreover, this also provides a secure framework in which no exchange of keys over the wireless channel is required. The query terminal 110 or base station 106 is designed to do the necessary encryption and decryption.

At initialization, all objects are marked private or public. Private objects have their descriptors encrypted using the owner's public key while public objects have their descriptors stored as clear text. When an owner queries for his objects, the query statement is encrypted at the query terminal 110 using his public key. The encrypted query and its plain text are sent to the designated base stations 106 at the same time. The encrypted component matches the private objects while the clear text component will match all the public objects. All results are then returned to the query terminal 110, where the encrypted descriptors are decrypted with the owner's private key.

In the system 100, physical space can be designated as public, private or off-limits. Any user can query for physical objects in a public space but only an authorized user can search for objects in a space that is designated off-limits. The authentication is done by the security agent 112 residing at the base station 106. The security agents 112 communicate with the query terminals 110 via secure tunnels. Users will be authenticated before they are allowed to query the locality served by the base station 106. RSA encryption-based handshaking can be used to prevent any unauthorized access of the locality, allowing the owner of the locality to grant and deny access. This will prevent any unauthorized access of the space. The space is thus off-limits to anyone but the owner of the space.

The security agents 112 use standard software authentication at the base station 106, which is fully customized, line powered and connected to the high-speed backbone 108. Thus, there is no or little issue of durability, processing power, or communication overhead. To support encryption of private objects, typically a query twice the size of an original query statement is sent.

FIG. 3 shows communication between the tags 102, the substations 104 and the base station 106 of the system 100. The system 100 is designed with the objective of minimizing transmission cost. Specifically, the system 100 avoids the bursty flooding of a single receiving node from multiple sources and has provision for detecting and retransmitting missing packets, using a timeout mechanism.

A single query session begins with the user inputting the query into the query terminal 110 (FIG. 1). The query is sent to the base station 106. After receiving the query, the base station determines the number of substations 104 at step 302. At step 304, the substations 104 reply with the respective ID.

At step 306, the base station 106 then proceeds to send the query to all the substations 104. At step 308, the substations 104 determine the number of tags 102 in the vicinity. The tags 102 reply with the respective ID at step 310 before the substations 104 broadcast the query to all the tags 102. At step 312, the substation 104 requests for tag descriptors of the tags 102. At step 314, the tags 102 reply to the substations 104 with the respective tag descriptors. Steps 312 and 314 are repeated for all the tags 102. The respective tag descriptors are downloaded by the substation 104 in a round robin fashion and cached in its internal EEPROM memory. At the same time, query statistics are compiled and a match count vector is sent to the base station 106 at step 316. The match count vector comprises value pairs, namely a match count and the number of tags having the match count.

Based on match count vectors from all the substations 104, the base station 106 makes a global decision on the match count threshold for the tags 102. Due to a high degree of overlap, repeated downloading of tag descriptors is avoided by first requesting the tag identities from the substations 104 as well as the associated RSSI values with respect to the substations 104 for matching tags with match counts equal to or above the match count threshold at step 318. At step 320, the substations 104 reply with the tag ID, number of match counts and RSSI value with respect to the substations 104.

At step 322, the base station 106 then requests for the tags with the tag descriptors which are not retrieved previously and the substations 104 reply with the tag ID and RSSI value with respect to the substations 104 at step 324. Finally, the base station 106 requests for the locations of the substations 104 at step 326 and the substations 104 reply with the respective locations at step 328. Steps 320 to 328 are repeated and carried out sequentially for all the substations 104. The search process is completed when all the relevant information is retrieved from all the substations 104.

At the end of the search process, the tag descriptors of the selected tags 102, a list of substations 104 in the vicinity of each tag 102 and the respective estimated proximity based on RSSI readings are sent to the query terminal 110.

Figure 4:
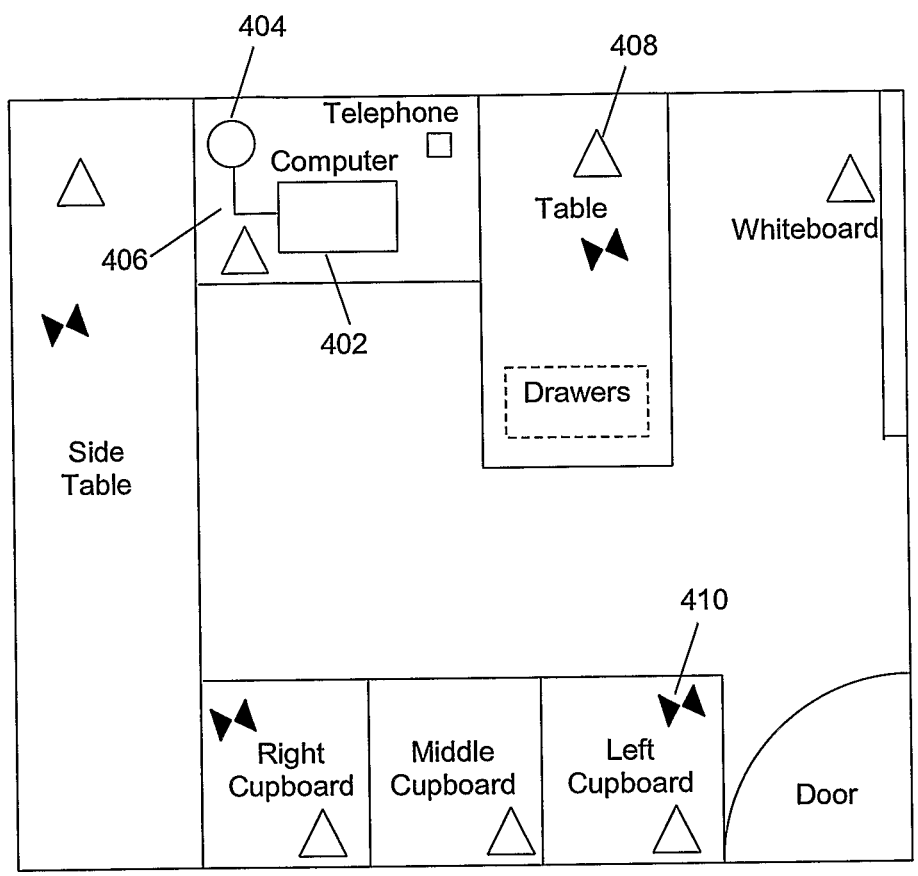
FIG. 4 shows a small-scale system implementation of the system in a room.

FIG. 4 shows a small-scale system implementation 400 of the system 100 in a room. The system 400 is developed to explore the various issues in design of the system 400. The system 400 is implemented using Crossbow's MICA2 wireless sensors. The MICA2 mote features an 8-bit AVR RISC microcontroller with 4 KB of RAM with 512 KB of EEPROM for persistent data storage. The mote provides a radio link based on the CC1000 Low-Power RF Transceiver. TinyOS is used in operation of the mote. All query statements and descriptors are sent over multiple packets since a maximum packet size of 29 bytes is provided in TinyOS.

The system 400 comprises a computer 402 used as a query terminal and a base station 404. The computer 402 is connected to the base station 404 via a serial link 406. A simple GUI is provided to the user through which a query is conducted. A search is initiated by the user inputting the query string. The system will scan the search environment and present a list of matching tags in order of decreasing relevance. A user may further inquire on the possible locations of any specific tag of interest.

The computer 402 has a gateway mote (not shown) attached via the serial link 406. The gateway (not shown) serves as an interface between the substations 408 and the computer 402. The base station 404 is implemented in software within the computer to utilize the available resources and also to accelerate development and trials. The system 400 assumes that the tags 410 can respond conditionally to queries if there are matches. In addition, the tags 410 also have the ability to respond with the match count for a query.

Figure 9:
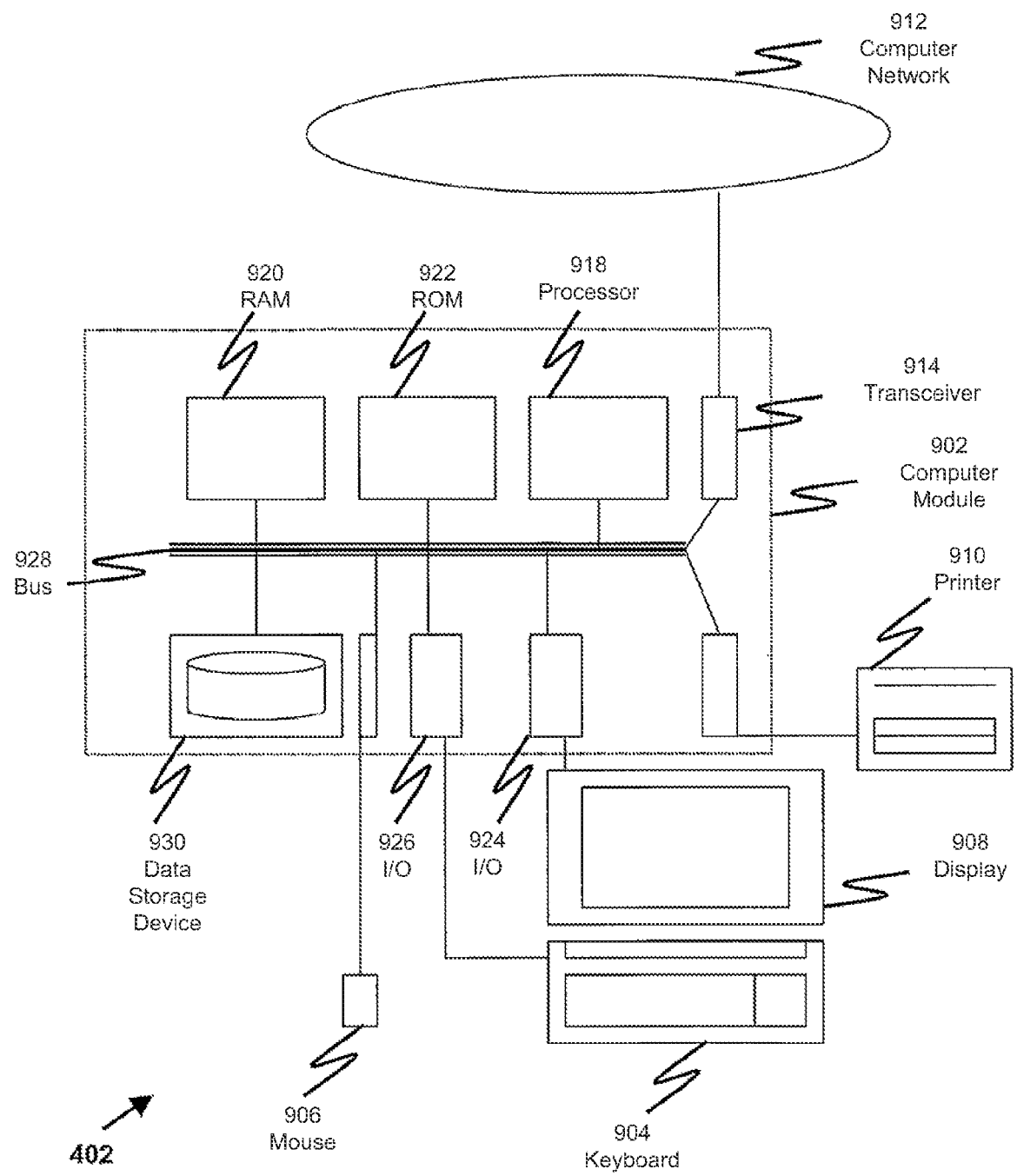
FIG. 9 shows a computer implementation of the system as shown in FIG. 4.

The method and system for searching for physical objects is implemented on the computer 402, schematically shown in FIG. 9. It may be implemented as an interrogation engine, such as a computer program being executed within the computer 402, and instructing the computer 402 to conduct the method of the example embodiment.

The computer 402 comprises a computer module 902, input modules such as a keyboard 904 and mouse 906 and a plurality of output devices such as a display 908, and printer 910.

The computer module 902 is connected to a computer network 912 via a suitable transceiver device 914, to enable access to e.g. the Internet or other network systems such as Local Area Network (LAN) or Wide Area Network (WAN).

The computer module 902 in the example includes a processor 918, a Random Access Memory (RAM) 920 and a Read Only Memory (ROM) 922. The computer module 902 also includes a number of Input/Output (I/O) interfaces, for example I/O interface 924 to the display 908, and I/O interface 926 to the keyboard 904.

The components of the computer module 902 typically communicate via an interconnected bus 928 and in a manner known to the person skilled in the relevant art.

The application program is typically supplied to the user of the computer 402 encoded on a data storage medium such as a CD-ROM or flash memory carrier and read utilising a corresponding data storage medium drive of a data storage device 930. It will be appreciated by a person skilled in the art that the searching for physical objects can also be performed using the internet. The application program is read and controlled in its execution by the processor 918. Intermediate storage of program data maybe accomplished using RAM 920.

To verify the sufficiency of approximate localization, a confidential user trial on the system 400 is conducted. Four tagged objects and seven substations 408 are placed in the room. In the user trial, the room and the four objects are marked public.

Ten random subjects with no prior knowledge of precise layout of the room are instructed to find the tagged objects in the room. They are instructed to locate two objects with the system 400 and two objects manually. For each pair of objects, one is visible and the other is not in visible range. The subjects are given a simple description of the objects they are looking for. Similarly, the system also provides the users with very simple and coarse description of the location of the objects. At the same time, all the substations 408 and tags 410 are hidden from sight to prevent any extra visual cues.

Without the aid of the system 400, the mean time taken to locate the objects is about 101.4 s with a standard deviation of about 87.3 s. The time taken ranges from about 10 s to 300 s. With the aid of the system, the timing improved to a mean of about 39.8 s with standard deviation of about 35.5 s. The minimum and maximum time taken improve about 2 s and 110 s, respectively. There were 3 instances in which the subject gave up on searching for an object without the system. With the aid of the system 400, the user managed to find the objects between about 15 s to about 70 s.

With the application and testing of the prototype, RSSI readings were found to vary for a variety of reasons besides proximity of tags 410 and substations 408. The RSSI readings are heavily dependent on the transmission power. Furthermore, the readings are also found to be dependent on directionality of a monopole antenna.

A high overlap may be experienced in the system 400, due to the relatively long transmission range of the RF-based system, which may present numerous constraints on the scalability of the system. As each substation 408 needs to service more tags 410 in its region of transmission, a huge requirement of memory has to be incurred to cache the tag descriptors. Therefore, the memory requirements of the substations 408 have to be carefully considered in any implementation of the system 400.

High overlap also results in an increased congestion and thus a higher probability of missing packets. The resulting retransmissions can produce large delays. At the same time, the failure to gain channel access may lead to the need for a queue to store pending messages. This message queue forms a significant amount of memory requirement in the substation 408. This suggests that a "little or no" overlap system is desirable when it comes to system efficiency and delays. In other words, a long-range RFID may be used to reduce the number of substations 408 required but may cause increased delays and latency.

In the case that the room is marked private, there are three classes of physical objects to consider, namely public objects, private objects owned by the owner of the private space and private objects owned by a third party. Another application of the system 400 for illustrating search results returned to different kinds of users for a query of a public or private object in a private space is described in the following.

In an example scenario, there are three characters, Alice, Bob and Charlie. Alice has designated the room as her private space. The room has some public and some private objects which Alice owns. Bob has mistakenly left his cell phone, which is marked private, in Alice's home. The security agent (not shown) residing at the base station 404 in Alice's home authenticates and allows Alice to search for all public and private objects which she owns and the locations of these objects are returned to Alice.

If Charlie does a search for public objects in Alice's room, the clear text query and the query encrypted with Charlie's public key are sent together. Since Alice's private objects are encrypted with her private key, only the public objects in her home match the clear text query. In addition, the security agent (not shown) at the base station 404 ensures that only a binary answer, indicating the presence or absence of the object in Alice's room, is returned to Charlie without providing the location of the object in Alice's room.

If Bob searches for his cell phone in Alice's room, the clear text query and encrypted text with Bob's public key are sent together. In this case, Bob's cell phone will match the encrypted query. However, only a binary result, indicating the presence or absence of Bob's cell phone in Alice's room, is returned to Bob.

Design of Query Protocol

Referring back to FIG. 1, the design choices of the system 100 (FIG. 1) are dependent on devices, e.g. customized passive tags with comparators and query protocols used. Two issues of critical concern are energy and latency. Since the substations 104 are assumed to be battery powered, energy is a critical resource that should be conserved as much as possible, to ensure durability of the device and system 100. In addition, results must be returned to the user as quickly as possible to enhance user experience.

A methodology used to design a delay optimal protocol and an energy optimal protocol is described in the following. A valid protocol is a set of actions, which brings the system 100 from a starting state to a desired end state. The constraint of optimization is the set of actions available to the system. Using the methodology, the performance of the system 100 with different device choices is investigated. The methodology described in the following is a small but representative subset of the final optimization performed to find the optimal query protocols.

Figure 5A:
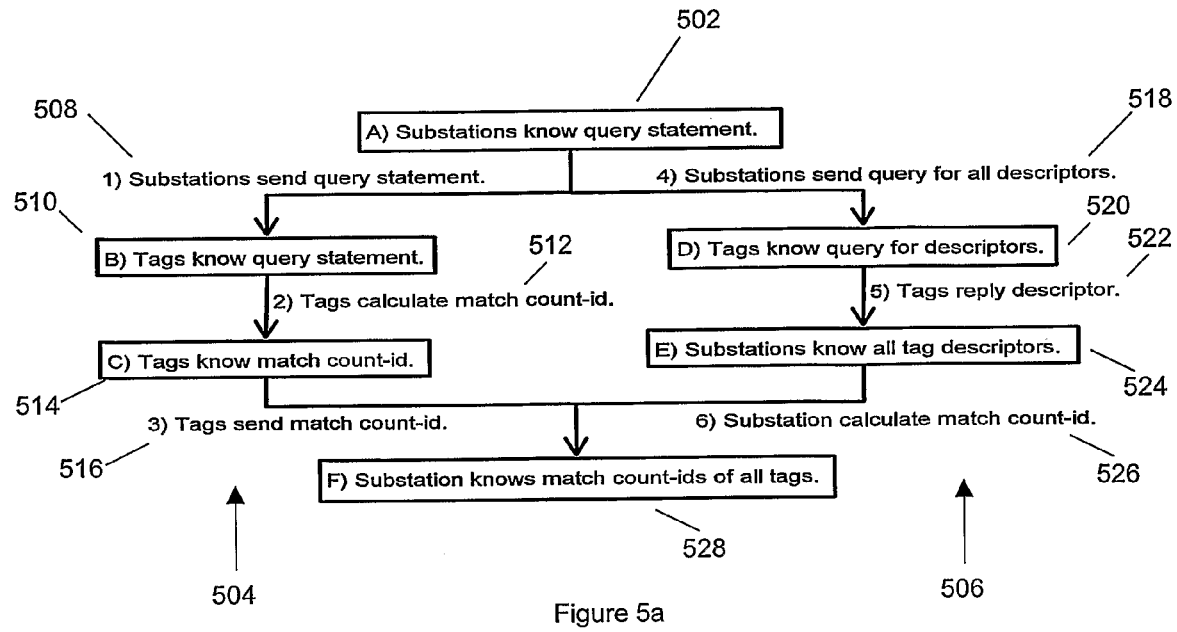
FIG. 5a shows a flowchart illustrating two possible subset approaches for arriving at a protocol for the system.

One way of arriving at a protocol is to think of all the possible approaches. FIG. 5a shows a flowchart illustrating two possible approaches. It is possible to make a choice between these options by comparing their total costs.

At step 502, the substations know a query statement. After step 502, a choice has to be made between two options 504 and 506. If option 504 is chosen, the substations send the query statement to the tags at step 508. At step 510, the tags know the query statement. At step 512, the tags calculate match count-identities (ids). At step 514, the tags know the match count-ids. At step 516, the tags send the match count-ids to the substations.

If option 506 is chosen, the substations send a query for all descriptors to the tags at step 518. At step 520, the tags know the query for the descriptors. At step 522, the tags reply with the descriptors. At step 524, the substations know all the tag descriptors. At step 526, the substations calculate the match count-ids.

At the last step 528 for both options 504 and 506, the substations know the match count-ids of all the tags.

To enable systematic search for the best protocol, all possible combinations of actions are explored. Each action brings the state of the system from one to another. In addition, each action is associated with a cost representing the effort required to execute it. Thus, the cost of a protocol is the summation of costs associated with all its actions. At the same time, each action requires a certain pre-requisite state before it can be performed.

To formulate a tractable problem, it is preferred to ensure that the states are Markovian. This can ensure that the possible actions at each state are independent of the previous states.

A primitive state is defined to represent the knowledge of a device in the system. For example, primitive state A of FIG. 5a represents that the substations know the query statement entered by the user.

An action transforms the system from one primitive state to the other and incurs a cost in the process. Given a primitive state-action pair, one can determine the subsequent primitive state. Action 1 of FIG. 5a is described as "Substations send query statement". Action 1 requires primitive state A as a prerequisite state and brings the system to the next primitive state B.

Figure 5B:
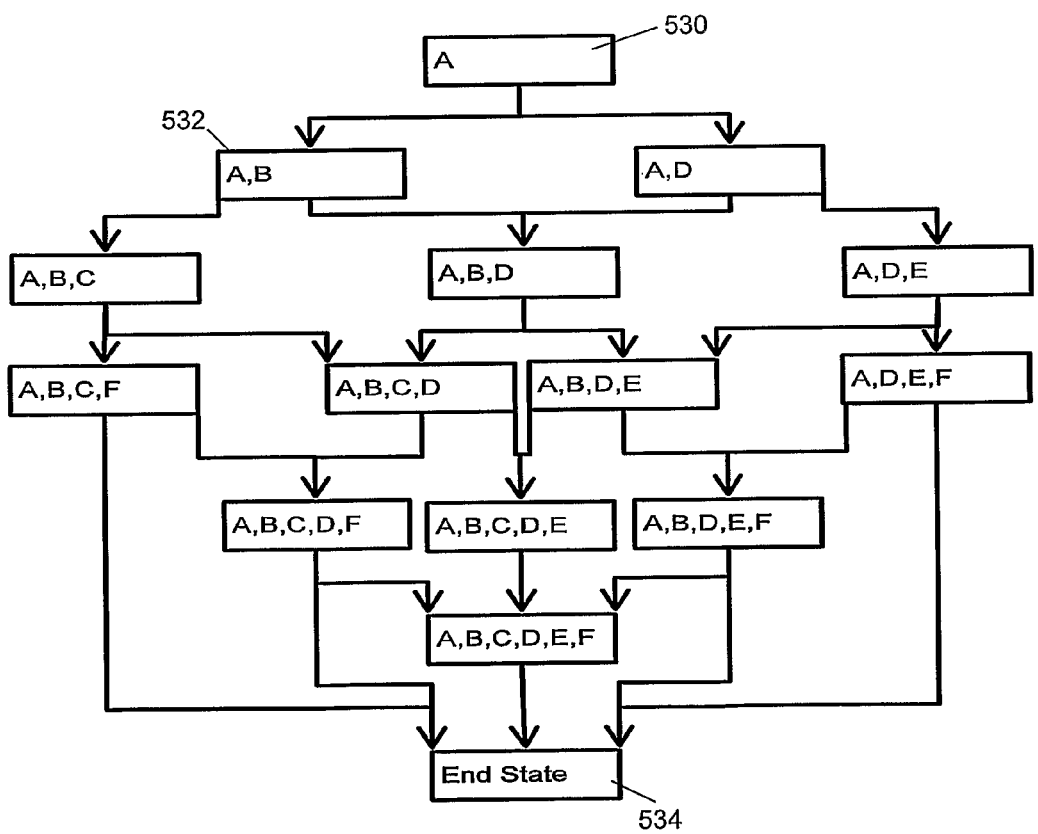
FIG. 5b shows a flowchart illustrating possible state action pairs.

A state is defined as a vector of primitive states. For example, a state [A;B] 532 consists of primitive states A and B, as shown in FIG. 5b. Thus, the system can be moved from state [A] 530 to state [A;B] 532 using Action 1 of FIG. 5a.

After defining the states and actions for the system, an optimal protocol can be designed by finding the minimum cost path from the specified starting state 530 to a desired end state 534. Several end states can be accepted for the protocol for the system. Thus, an artificial end state, which can be reached from the various possible end states using a costless action, is created. A costless action is the action which moves every state containing primitive state F to the arbitrary End State 534 in FIG. 5b. The states are represented as vertices of a graph and actions as edges. Each edge has a weight corresponding to the energy or delay required to execute the respective action. Any shortest path algorithm, such as Djikstra's algorithm, can be employed to find the optimal protocol.

According to the above methodology, 45 primitive states and 64 actions can be formulated. The primitive states basically represent the knowledge of each device, which can be roughly categorized into query statement, match counts, descriptors and any decision made. Therefore, careful permutation of the possible primitive states can be performed. On the other hand, the possible list of processing actions is bounded by the information available at the device, i.e. the primitive states. One can only send the information to another device or process it to gain new information. Thus the processing actions can be exhaustively listed. It is essential to check that each primitive state must be reachable from another primitive state via an action unless it is the starting primitive state. At the same time, each primitive state has to have an action that allows it to move to another primitive state unless it is the ending primitive state. This can ensure that the set of primitive states and actions are consistent. If all the possible states are listed, there may be a total of $3{,}518{\times}10^{13}$ possible states. By careful consideration, the number of states can be drastically reduced to 89,350. This consideration is preferred for the problem to remain tractable. Such consideration is demonstrated in FIG. 5b, where a total of 32 states can be generated while only 14 states are possible. The listing of the states can be automated.

It is noted that an inventory of the RFID tags by the substations is a one-time process, which is of negligent cost to each query. It is also assumed that the base station is computationally powerful and line-powered. Thus, any computation within the base station suffers negligible delay. Based on the fact that the minimization of energy is to achieve durability, any energy cost of actions performed by the base station is neglected. Communication between the base station and the substations incurs cost at the substations, which cannot be ignored. Therefore, the energy consumption of the protocols is only those incurred by the substations and the tags.

FIG. 6a shows Table I which shows hardware device parameters of the system 100 (FIG. 1). The hardware values are used to determine the energy and latency costs of the various actions. These values are derived from currently available hardware, namely the Crossbow's MICA2 sensors, Skye-Tek's RFID reader and ISO15693 RFID tags. FIG. 6b shows Table II which shows simulation parameters of the system 100 (FIG. 1). With the technique as described above and values in Tables I and II, the optimal protocols for various scenarios are computed based on different choices available during system design.

During system design, the use of customized smart tags that can calculate and transmit match count of the tags to the substation is investigated. The smart tags can also transmit the descriptor of the tags according to a match count threshold. The appropriate amount of processing to push down the system hierarchy is also investigated. In a centralized system, the decision for selection of tags cannot be locally performed by the substations. In a distributed system, the decision for selection of tags can be locally performed by the substations.

It is also found that the results can be globally or locally relevant in a centralized system. A globally relevant result is one which consists of all of the most relevant results of the "number of selected tags" $N_{T(S)}$. This requires all match counts and identity pairs to be returned to the base station for selection to be performed. Alternatively, the base station may decide based on other statistics such as match count vector or a subset of the match count and identity pairs. In such cases, the results will be termed as locally relevant.

Subsequently, to test the effect of overlapping coverage by the substations, the optimal protocols are computed after changing the values in Table II. The value of "sum of tags under each substation" $\Sigma N^i_T$ is changed from 2250 to 7500 and the value of "maximum number of tags under a substation" max. $N^i_T$ is changed from 45 to 225. The values of "total number of selected tags" $\Sigma N^i_T(S)$ and "maximum number of selected tags under a substation" $\max_i N^i_{T(S)}$ are changed from 40 to 200 and 10 to 50 respectively for decision by match count decided by the substations, and from 40 to 160 and 10 to 40 respectively for decision by match count decided by the base station. These values are changed to reflect the degree of overlapping coverage.

Finally, the number of tags per substation is being changed from 30 to 10 to represent a low number of tags, and from 30 to 50 to represent a high number of tags. Based on the above-mentioned values, Djikstra's algorithm is used to determine the protocols and the selected optimal protocols are presented in the following.

Energy-Latency Optimal Protocol for Distributed System with Dumb Tags Returning Locally Relevant Results
1) Query terminal queries base station
2) Base Station sends query statement.
3) Substations send query for all descriptors.
4) Tags all reply.
5) Substations calculate match-count from descriptors.
6) Substations calculate match count vector.
7) Substations calculate local match count.
8) Substations send locally decided match count.
9) Base Station approximates match count based on local ones.
10) Base Station sends globally decided approximate match count.
11) Substations filter for selected tag ids based on global approximate estimate.
12) Substations filter descriptors for globally selected ones (approx-match).
13) Substations send globally selected tag descriptors (approx-match).
14) Base Station filters sum of globally approximated tag descriptors.

Energy Optimal Protocol for Distributed System with Smart Tags Returning Locally Relevant Results
1) Query terminal queries base station.
2) Base Station sends query statement.
3) Substations send query statement.
4) Tags calculate match count.
5) Tags reply match count-id values.
6) Substations calculate match count vector.
7) Substations calculate local match count.
8) Substations filter for locally selected tags.
9) Substations send match count-id of locally selected tags.
10) Base Station filters locally selected tag match count-ids.
11) Base Station decides match count based on locally selected match-count ids.
12) Base Station filters locally selected match count-id for global approximate.
13) Base Station sends match count-id of globally selected tags (approx).
14) Substations send query by globally selected ids (approx-id).
15) Tags reply based on globally approximated selection (id).

16) Substations send globally selected tag descriptors (approx-id).

Energy-latency values of the selected protocols are tabulated in Table III shown in FIG. 7. Row 702 of Table III shows the energy and latency values for a low overlap system by simulating with either 30 smart tags or 30 dumb tags and with the values in Table II.

Row 704 of Table III shows the energy and latency values for a high overlap system by simulating with either 30 smart tags or 30 dumb tags and with the values, $\Sigma N^i{}_T=7500$, $\max_i N^i{}_T=225$ and $\Sigma N^i{}_T(S)=200$, $\max_i N^i{}_{T(S)}=50$ for decision by match count decided by the substations, i.e. a distributed system, or $\Sigma N^i{}_T(S)=160$, $\max_i N^i{}_{T(S)}=40$ for decision by match count decided by the base station, i.e. a centralised system.

Row 706 of Table III shows the energy and latency values for a system having a low number of tags by simulating with either 10 smart tags or 10 dumb tags and with the values, $\Sigma N^i{}_T=7500$, $\max_i N^i{}_T=225$ and $\Sigma N^i{}_T(S)=200$, $\max_i N^i{}_{T(S)}=50$ for decision by match count decided by the substations, i.e. a distributed system, or $\Sigma N^i{}_{T(S)}=160$, $\max_i N^i{}_{T(S)}=40$ for decision by match count decided by the base station, i.e. a centralised system.

Row 708 of Table III shows the energy and latency values for a system having a low number of tags by simulating with either 50 smart tags or 50 dumb tags and with the values, $\Sigma N^i{}_T=7500$, $\max_i N^i{}_T=225$ and $\Sigma N^i{}_T(S)=200$, $\max_i N^i{}_{T(S)}=50$ for decision by match count decided by the substations, i.e. a distributed system, or $\Sigma N^i{}_T(S)=160$, $\max_i N^i{}_{T(S)}=40$ for decision by match count decided by the base station, i.e. a centralised system.

Smart tags which allow the protocol to operate in multiple rounds are used. In the first round, the smart tags which have matches to the query respond with their match counts. In the subsequent round only the smart tags which have match counts greater than some threshold are asked to respond with their descriptors. Meanwhile, dumb tags can only reply with the respective tag descriptors to the query.

Figure 8A:
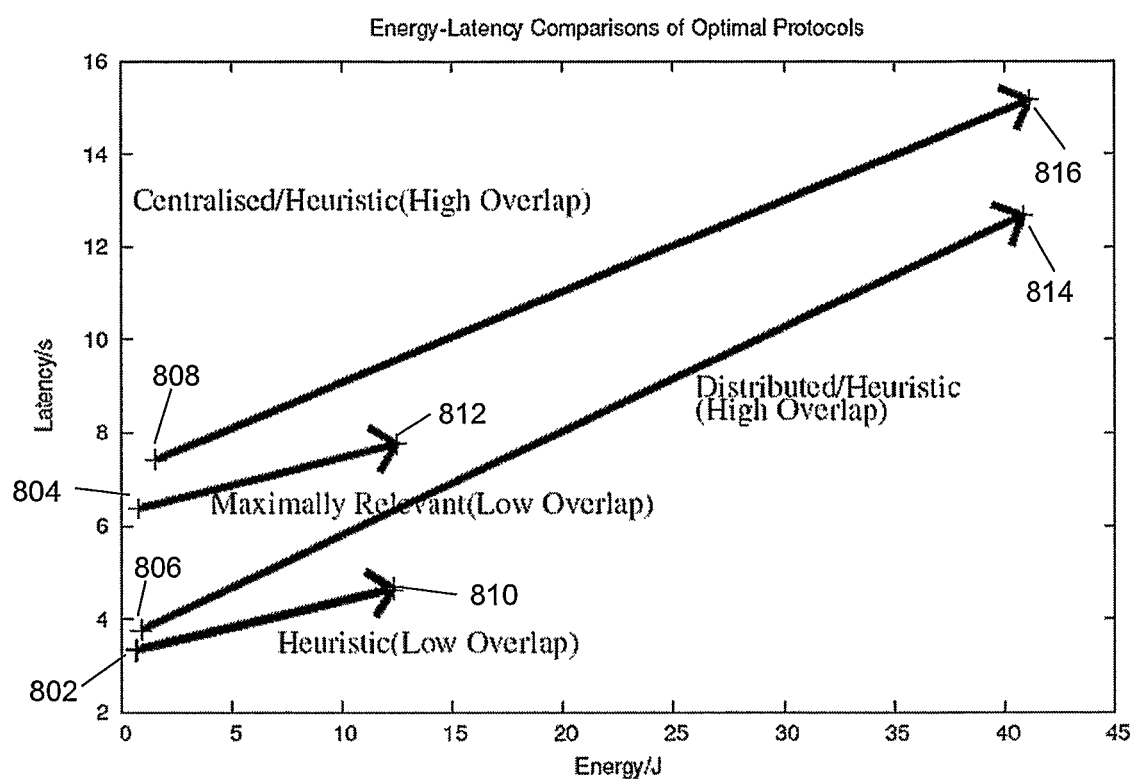
FIG. 8a shows an increase in both energy consumption and latency incurred when smart tags are replaced by dumb tags.

FIG. 8a shows an increase in both energy consumption and latency incurred when smart tags (points 802, 804, 806 and 808) are replaced by dumb tags (points 810, 812, 814 and 816). FIG. 8a shows that the energy consumed increases by an average of about 17.66 times, while the delay incurred increases by an average of about 1.31 times for a low overlap system when smart tags (points 802 and 804) are replaced by dumb tags (points 810 and 812). It is found that in all the optimal protocols for smart tags, the match count is tabulated by the tags. This reaps the benefits of parallel processing, which is not possible with dumb tags, and thus providing a lower energy consumption and a lower latency incurred.

FIG. 8a shows that the energy consumed and latency incurred for a high overlap system by using dumb tags (points 814 and 816) is increased by about 37.25 times and 2.71 times respectively as compared to using smart tags (points 806 and 808). Both values are significantly larger than that for low overlap system. Therefore, it is better to use smart tags for a high overlap system.

Figure 8B:
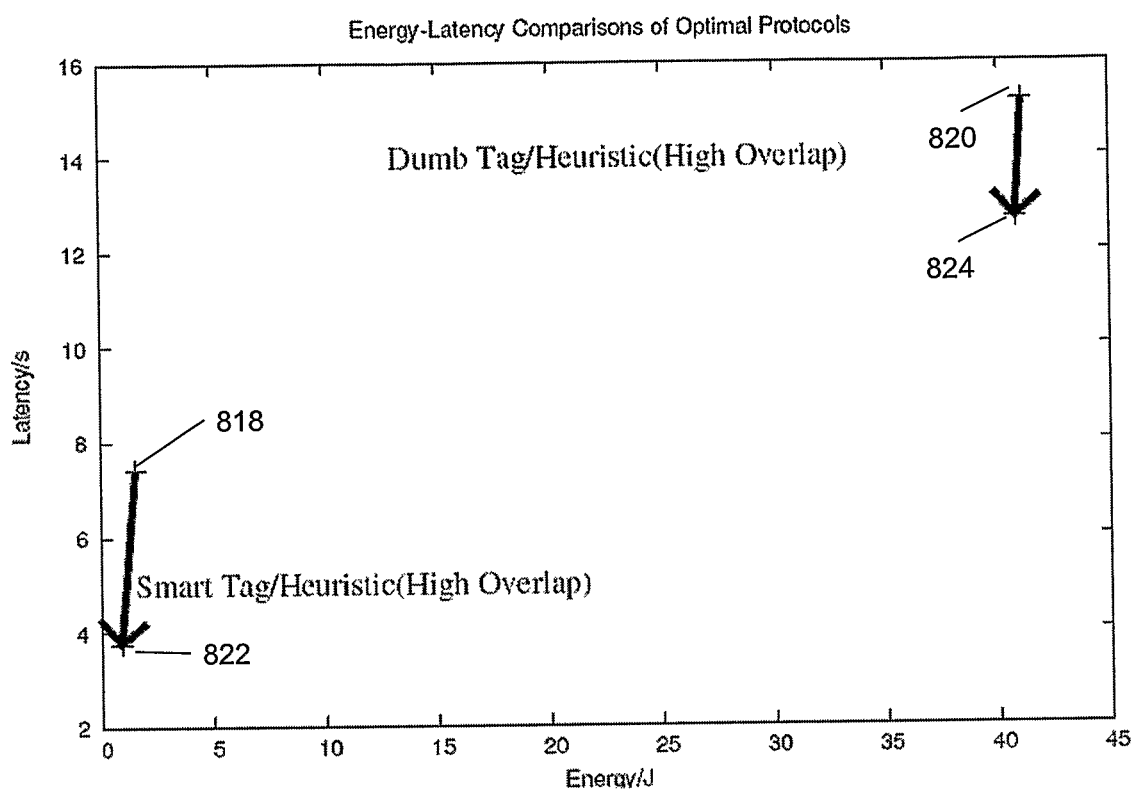
FIG. 8b shows a slight decrease in the energy consumption and a larger decrease in the latency incurred when a centralised system is changed to a distributed system.

FIG. 8b shows a slight decrease in the energy consumption and a larger decrease in the latency incurred when a centralised system (points 818 and 820) is changed to a distributed system (points 822 and 824). The energy consumed and latency incurred changes by about 0.990 and 0.996 times respectively. In both cases, the tag descriptors are retrieved using a globally decided match count threshold. The difference is that the distributed system allows the match count threshold to be decided locally, resulting in little savings in energy and latency.

The results are affected by various factors. Firstly, the substations are modelled as Crossbow MICA2 sensors, which consumed large idle power. Thus, the energy for computation may well be significant compared to that for communication. Secondly, the degree of overlap of the system has significant impact to the result. FIG. 8b shows that the latency of the distributed system is decreased by about 0.836 and 0.507 times for dumb and smart tags respectively as compared to the centralised system. For smart tags, a significant decrease in energy consumed of about 0.566 times can also be observed. Therefore, it is better to use the distributed system for a high overlap system.

Figure 8C:
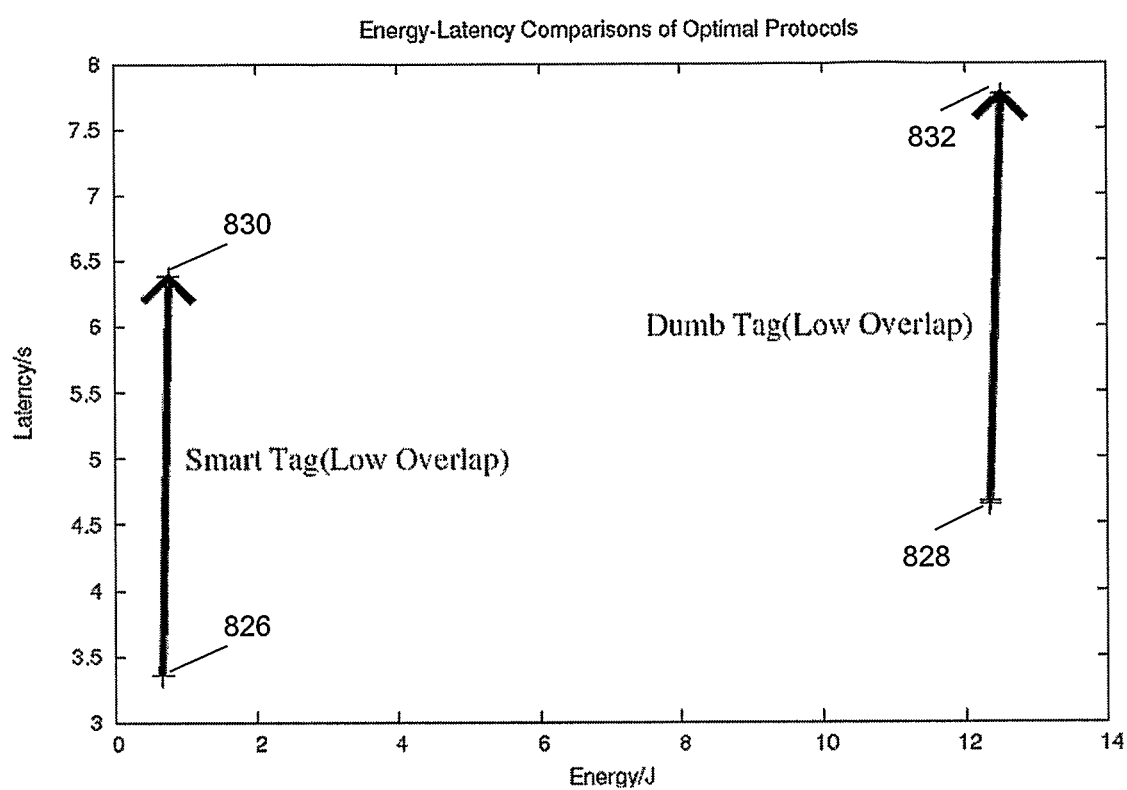
FIG. 8c shows a significant increase in latency incurred and little change in energy consumed when globally relevant results are required instead of locally relevant results.

FIG. 8c shows a significant increase in latency incurred and little change in energy consumed when globally relevant results (points 830 and 832) are required instead of locally relevant results (points 826 and 828). As such, the cost of ensuring globally relevant results in a centralized system may be higher as compared to ensuring locally relevant results. The latency incurred and energy consumed increase by about 1.789 and 1.097 times respectively. For globally relevant results, the match count and identity pairs of the tags are all delivered to the base station, contributing to the increased latency. However, as match-identities are small in size and querying by identities eliminates any unnecessary querying of descriptor, the energy increment is minimal.

Figure 8D:
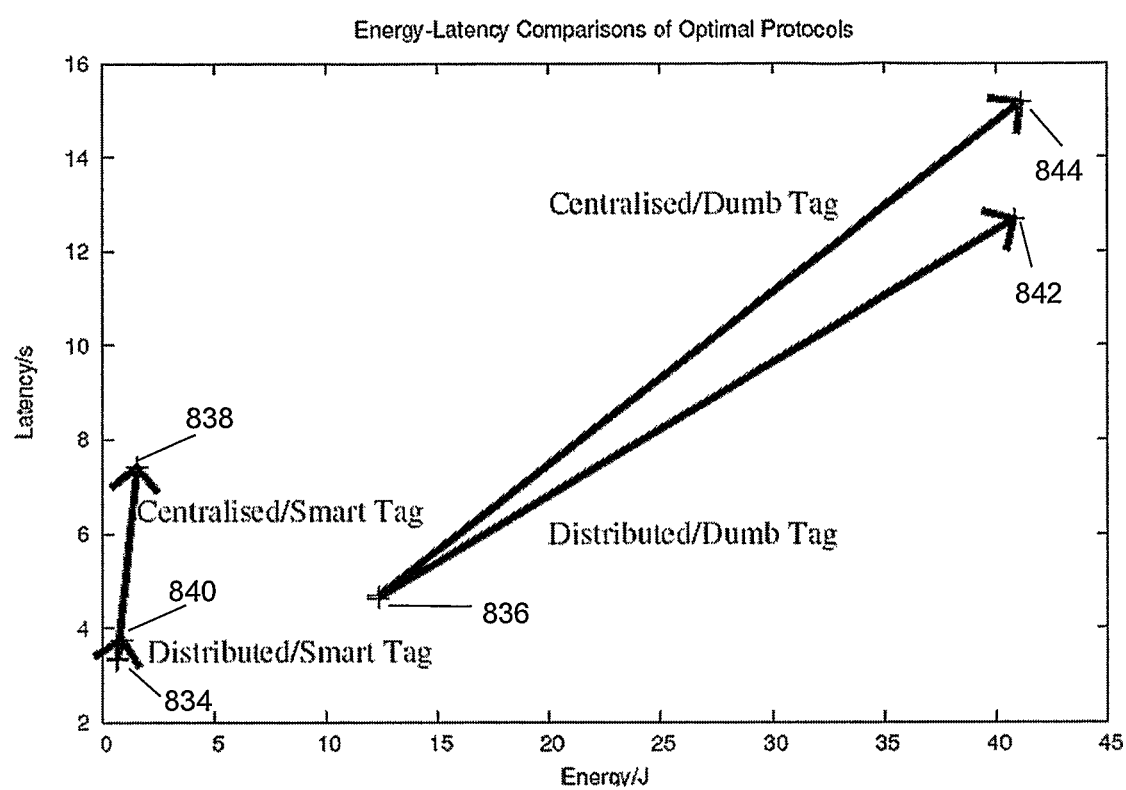
FIG. 8d shows an increase in both energy consumption and latency incurred when a low overlap system is changed to a high overlap system.

FIG. 8d shows that there is an increase in energy consumed ranging from about 1.350-times to about 3.329 times and an increase in latency incurred ranging from about 1.133 times to about 3.245 times when a low overlap system (points 834 and 836) is changed to a high overlap system (points 838, 840, 842 and 844). There is a large increase in both energy consumed and latency incurred. Thus, there is a large increment in cost due to the large number of repetition, especially observable in dumb tags.

It is observed that the exact number of selected tags will respond if the querying is performed using identities decided by the base station having a complete set of match count and identity pairs. However, if querying is performed using a threshold match count decided at base station, the descriptors of tags in the vicinity of more than one substations will be retrieved multiple times due to overlap. Thus, the number of returned results have to be scaled.

Figure 8E:
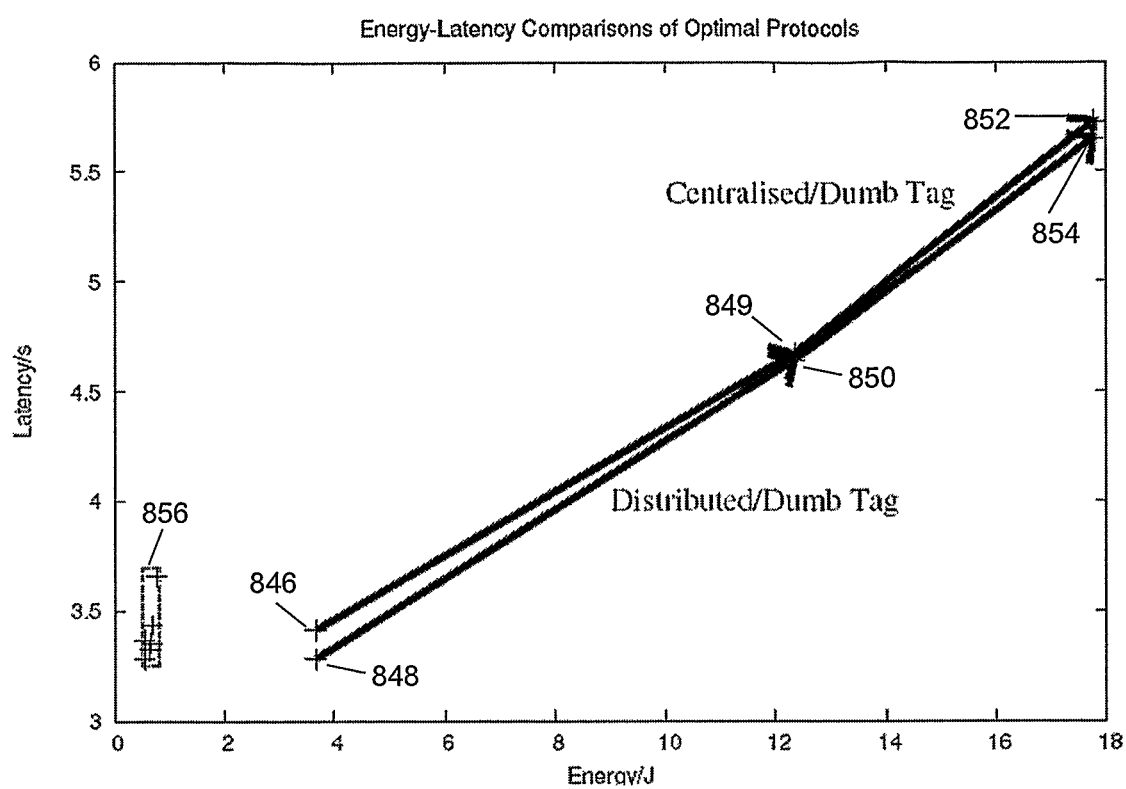
FIG. 8e shows an increase both energy consumption and latency incurred when the number of tags per substation increases.

FIG. 8e shows an increase in the energy consumed and latency incurred of about 2.284 times and about 1.198 times respectively when the number of tags per substation increases from 10 (points 846 and 848) to 30 (points 849 and 850). FIG. 8e also shows an increase in the energy consumed and latency incurred of about 3.084 times and about 1.383 times respectively when the number of tags per substation is increased from 10 (points 846 and 848) to 50 (points 852 and 854).

Figure 8F:
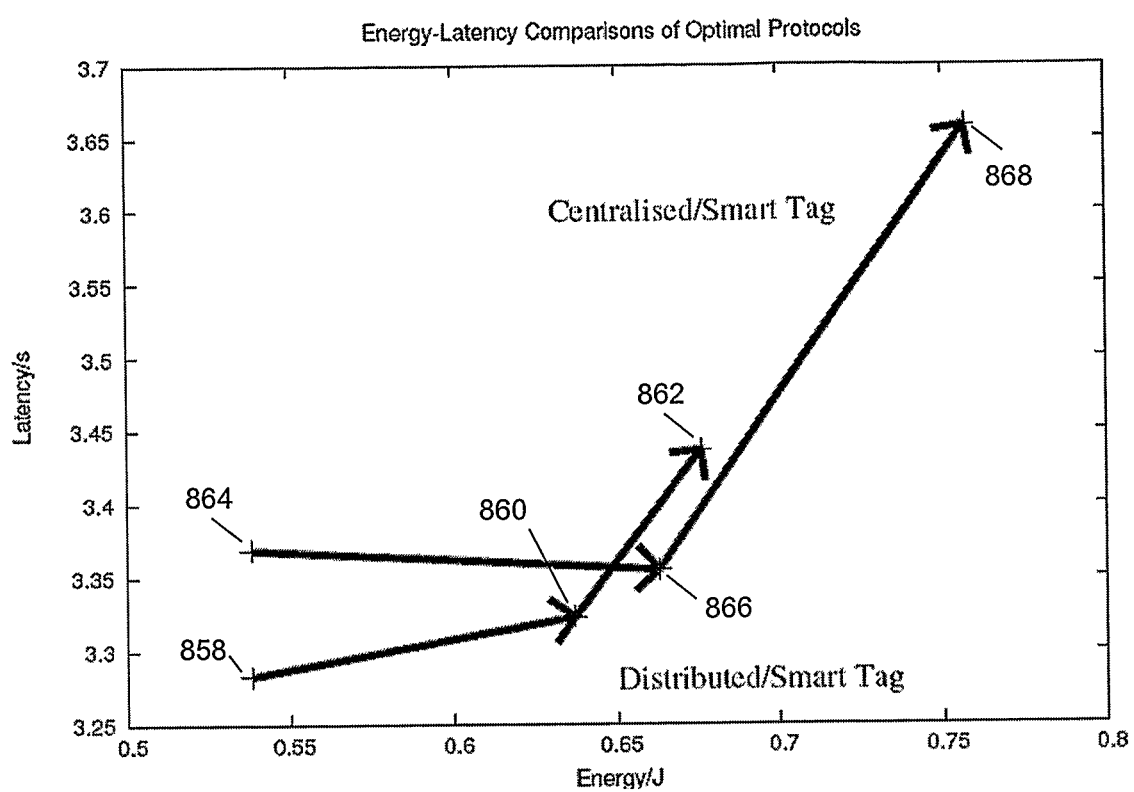
FIG. 8f shows an increase both energy consumption and latency incurred when the number of smart tags per substation increases.

FIG. 8f shows an expanded view of an area 856 shown in FIG. 8e. FIG. 8f shows an increase in the energy consumed and latency incurred of about 1.185 times and about 1.012 times respectively when the number of smart tags per substation is increased from 10 (point 858) to 30 (point 860) for a distributed system. FIG. 8f also shows an increase in the energy consumed and latency incurred of about 1.25 times and about 1.052 times respectively when the number of smart tags per substation is increased from 10 (point 858) to 50 (point 862) for a distributed system.

For a centralised system, FIG. 8f shows an increase in the energy consumed and a decrease in latency incurred of about 1.222 times and about 1.006 times respectively when the number of smart tags per substation is increased from 10 (point 864) to 30 (point 866). FIG. 8f also shows an increase in the energy consumed and latency incurred of about 1.407 times and about 1.086 times respectively when the number of smart tags per substation is increased from 10 (point 864) to 50 (point 868) for a centralised system.

It is observed that the increase in energy consumed and latency incurred is approximately linear with the number of tags, which indicates the scalability of the system. At the same time, the increase in energy consumed and latency incurred is smaller for smart tags allowing for more smart tags per substation to be deployed.

From the above results, in the design of optimal protocols, the delay optimal and energy optimal protocols are found to be identical. No trade-off between energy efficiency and latency is observed. In most wireless systems, improving the performance of one metric implies relaxing the requirement on the other. However, due to the nature of passive RFID, this is not observed for the delay optimal and energy optimal protocols.

Further, it is observed that a significant saving in latency can be achieved by foregoing globally relevant results.

The system as described above is simple to install and easy to use. The system uses natural human language for inputting of queries and presenting search results, which allows a user to interact with the system at ease. In addition, the system is robust to reconfiguration of physical spaces and requires minimal changes when such reconfigurations occur.

Further, security may ensure that the system is not vulnerable to unauthorized access. Privacy may ensure that the movement and locations of privately owned objects cannot be continuously tracked and objects labelled private can only be searchable by their owners, while objects labelled public can be searchable by anyone.

The system also allows searching of physical objects across wide areas e.g. office buildings, university campuses or across a city. Search results can be returned quickly and the search process can utilize system resource such as bandwidth energy etc as efficiently as possible.

It will be appreciated by a person skilled in the art that numerous variations and/or modifications may be made, to the present invention as shown in the specific embodiments without departing from the spirit or scope of the invention as broadly described. The present embodiments are, therefore, to be considered in all respects to be illustrative and not restrictive.

It is appreciated by a person skilled in the art that the system may not only relate to searching of physical objects within a single locality. The system may be able to support both wide area search whereby a user can search for objects which are located in different localities, and remote search whereby the user can place a query from an arbitrary location. An abstract network backbone may be used to connect the various base stations and query terminals together. This network backbone may also exploit existing network connectivity, such as LANs, DSL, and WiFi, thus allowing scaling of the system across a wide geographical area.

The invention claimed is:

1. A system for searching physical objects having one or more tags disposed respectively thereon, the system comprising:
   one or more substations arranged for communication with tags located within a range around at least one of the one or more substations, and at least one of the one or more substations configured to communicate a descriptor of a location of a substation;
   a base station arranged for communication with one or more substations located within a range around the base station; and
   an interrogation engine residing in the base station and configured to interrogate, in response to a search query specifying at least one of the physical objects, the one or more substations within the range around the base station, to determine whether the at least one physical object specified by the search query is located within the ranges around the respective one or more substations;
   wherein the one or more substations are configured to request and receive, in response to the interrogating, one or more tag descriptors from the one or more tags, calculate respective values of one or more local match counts of a number of tag descriptors matching the search query, and communicate the respective values of the one or more match counts and a number of the tags corresponding to each of the respective values of the match counts to the interrogation engine; and
   wherein the interrogation engine is configured to determine a location of the at least one physical object matching the search query based at least in part on the respective values of the one or more match counts and the number of the tags corresponding to each of the respective values of the match counts.

2. The system of claim 1, further comprising a query terminal configured to input the search query and to display a search result.

3. The system of claim 1, wherein at least one of the one or more substations is configured to provide a list of tag descriptors of tags located within the range around the substation to the interrogation engine, together with values indicative of signal strengths from the respective tags.

4. The system of claim 3, wherein the tag descriptors comprise descriptions of the respective physical objects the tags are disposed on.

5. The system of claim 1, wherein the base station is configured to designate a space corresponding to the range of the base station as public or private, and wherein the interrogation engine is configured to process the search query in a manner dependent on whether the space is designated public or private.

6. The system of claim 5, wherein at least one of the tags is configured to designate a corresponding physical object as public or private, and wherein the interrogation engine is configured to process the search query in a manner dependent on whether the physical object specified by the search query is designated public or private.

7. The system of claim 5, wherein the interrogation engine is configured to instruct display of a search result in a binary form if the physical object specified by the search query is designated public and is located in a private space.

8. The system of claim 5, wherein the interrogation engine is configured to instruct display of a search result in a binary form if the physical object specified by the search query is privately associated with a first user and the physical object specified by the search query is located in a private space associated with a second user.

9. The system of claim 1, wherein the interrogation engine is configured to employ an interrogation engine protocol optimized for energy or latency, or both.

10. A method for searching physical objects having one or more tags disposed respectively thereon, the method comprising:
   interrogating, by an interrogation engine of a base station in response to a search query for at least one physical object, one or more substations within a range around the base station;
   requesting and receiving, by the one or more substations, in response to the interrogating, one or more tag descriptors from the one or more tags located within a range around at least one of the substations;

calculating, by the one or more substations, respective values of one or more local match counts of a number of tag descriptors matching the search query;

communicating, by the one or more substations to the interrogation engine of the base station, the respective values of the one or more match counts and a number of the tags corresponding to each of the respective values of the match counts;

determining, by the interrogation engine of the base station, a location of the at least one physical object matching the search query based at least in part on the respective values of the one or more match counts and the number of the tags corresponding to each of the respective values of the match counts.

11. The method of claim 10, further comprising utilizing a query terminal for inputting the search query and for displaying search results.

12. The method of claim 10, further comprising providing, by the one or more substations to the interrogation engine of the base station, respective values indicative of signal strengths from the respective tags received by the substation.

13. The method of claim 10, further comprising providing, by the one or more substations to the interrogation engine of the base station, a list of tag descriptions of tags within the range around the substation to the interrogation engine, wherein the tag descriptions comprise descriptions of the respective physical objects the tags are disposed on.

14. The method of claim 10, further comprising configuring the base station to designate a space corresponding to the range of the base station as public or private, and further comprising utilizing the interrogation engine to process the search query in a manner dependent on whether the space is designated public or private.

15. The method of claim 14, further comprising configuring at least one tag to designate the respective physical object as designated public or private, and further comprising utilizing the interrogation engine to process the search query in a manner dependent on whether the physical object specified by the search query is designated public or private.

16. The method of claim 14, further comprising utilizing the interrogation engine to instruct display of a search result in a binary form if the physical object specified by the search query is designated public and is located in a private space.

17. The method of claim 14, further comprising utilizing the interrogation engine to instruct display of a search result in a binary form if the physical object specified by the search query is designated private and associated with a first user and the physical object specified by the search query is located in a private space associated with a second user.

18. The method of claim 10, further comprising optimizing an interrogation engine protocol for energy or latency, or both.

19. The system of claim 1, wherein the interrogation engine is configured to determine a value of a global match count based on the respective values of the local match counts and the number of tags corresponding to each of the respective values of the match counts, and to communicate the value of the global match count to the one or more substations.

20. The system of claim 19, wherein the one or more substations are further configured to communicate the one or more tag descriptors corresponding to the value of the global match count to the interrogation engine to facilitate determining, by the interrogation engine, the location of the at least one physical object matching the search query based at least in part on the respective locations of the one or more substations that communicated the one or more tag descriptors corresponding to the value of the global match count.

21. The method of claim 10, further comprising determining, by the interrogation engine of the base station, a value of a global match count based on the respective values of the local match counts and the number of tags corresponding to each of the respective values of the match counts and communicate the value of the global match count to the one or more substations.

22. The method of claim 21, further comprising communicating, by the one or more substations to the interrogation engine, the one or more tag descriptors corresponding to the value of the global match count to the interrogation engine, and determining, by the interrogation engine, the location of the at least one physical object matching the search query based at least in part on the respective locations of the one or more substations that communicated the one or more tag descriptors corresponding to the value of the global match count.

* * * * *